Figure 1:
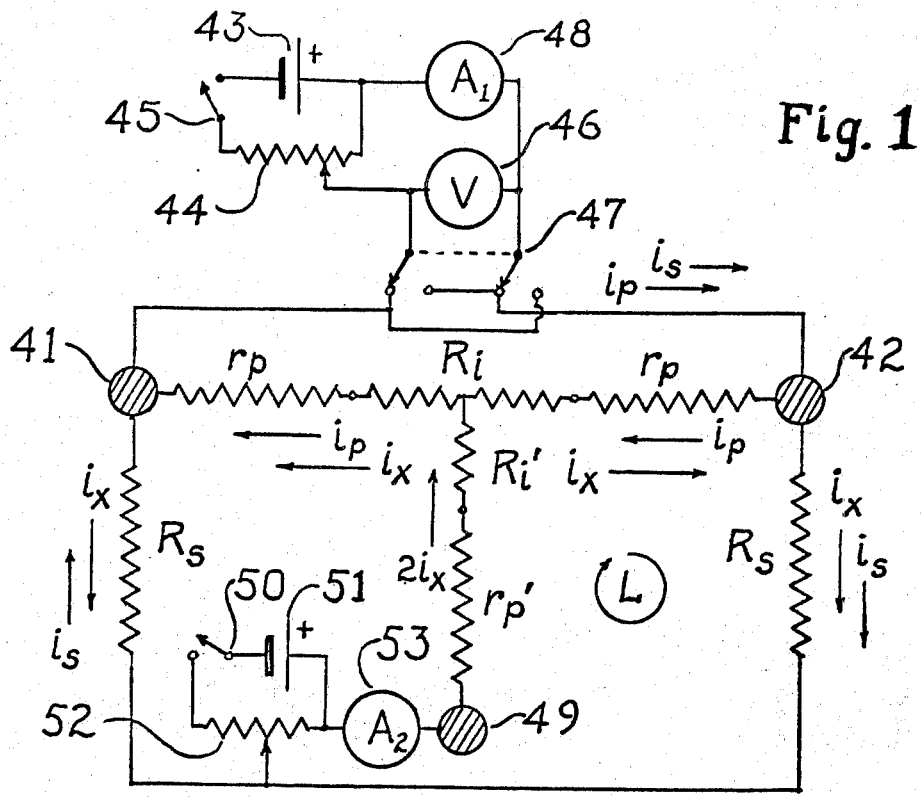

United States Patent [19]
Seyl

[11] 3,850,736
[45] Nov. 26, 1974

[54] DEVICE FOR MEASURING ACCELERATED CORROSION RATE

[76] Inventor: Robert G. Seyl, 1123 Mulford St., Evanston, Ill. 60202

[22] Filed: Sept. 25, 1972

[21] Appl. No.: 291,967

Related U.S. Application Data

[62] Division of Ser. No. 791,653, Jan. 16, 1969, Pat. No. 3,694,324.

[52] U.S. Cl. .............................................. 204/195 C
[51] Int. Cl. ........................................... G01n 27/46
[58] Field of Search .......... 204/195 C, 1 T; 324/29, 324/71 R

[56] References Cited
UNITED STATES PATENTS

| | | | |
|---|---|---|---|
| 3,436,320 | 4/1969 | Marsh | 204/1 T |
| 3,661,750 | 5/1972 | Wilson | 204/195 C |
| 3,692,624 | 9/1972 | Yrjala | 204/195 C |

*Primary Examiner*—G. L. Kaplan
*Attorney, Agent, or Firm*—Mann, Brown, McWilliams & Bradway

[57] ABSTRACT

A device for cathodically polarizing two duplicated electrodes with substantially no interference with corrosion current measurement made with said electrodes.

2 Claims, 2 Drawing Figures

DEVICE FOR MEASURING ACCELERATED CORROSION RATE

This application is a divisional application of my copending application, Ser. No. 791,653, filed Jan. 16, 1969, now U.S. Pat. No. 3,694,324.

The method of this invention utilizes and expands upon concepts, electrode configurations, and method steps of my method for measuring a corrosion current indicative of the corrosion rate occurring at the free electrode potential of an electronic-ionic conductor interface, as disclosed in my U.S. Pat. Nos. 3,156,631, 3,069,332, and 3,250,689.

The method of these patents starts with the concept that initial measurable range of polarizing DC current passed through an electronic-ionic conductor interface and of polarization voltage thereby produced, tends to occur in relationship form produced by or resulting from the current-potential relationships of an electrochemical mechanism operating within the interface. Method steps are devised to measure initial range of polarizing DC current-potential relationship with a minimum of distortions attributed to the operations of electrochemical factors which can vary in effect with the passage of time. Current-potential relationships measured by this method, when graphed to linear voltage and current axes, are distinguished in form by comprising a plurality of linear relationships extending between transition points of line slope change that occur at 0.02 volt separations, with these lines frequently occurring in a consecutively related order of slope change during early progress of the corrosion in the absence of dissolved oxygen. The operations of resolving this resultant form of measured current-potential relationship into the component form of corrosion mechanism that produces it, are accomplished through the concepts that each transition point occurs at the free electrode potential of what is termed an Interface Electrode, and that the related order of line slope change between consecutive transition points results from the anodic and cathodic polarizabilities of the interface electrodes being related to each other through mathematical order. This mathematical order is expressed through additional concept detail, and points to regarding the corrosion mechanism as an Interface Electrode System of mathematically related current-potential proportionalities, which operates within the electronic-ionic conductor interface as an inherent property such that the corrosion current becomes measurable through a characteristic Direct Voltage basically defined as the sum of the anodic and cathodic polarization voltages produced by a value of polarizing DC current made equal to the corrosion current. This Direct Voltage occurs within the initial range of substantial linearity of measurable anodic and cathodic current-potential relationships, the direct proportionalities of which enable precision simplified method measurement of the corrosion current of the Interface Electrode System from a single measurement of a polarizing DC current passed through the corrosion interface and of resulting polarization voltage occurring within this range of substantial linearity that extends from 0 to about 0.02 volt, with additional precision obtained by repeating the measurements with reversed direction of the DC current.

Corrosion current measurements made on a wide range of electronic-ionic conductor compositions, and excluding accelerating action such as that produced by dissolved oxygen, have demonstrated that in general, the measured corrosion current is an accurate and direct indication, through Faraday's Law, of the corrosion rate, with the valence change of anodic reaction equal to the corrosion product valence. A small number of corrosion interface compositions have been found in which the corrosion current initiates the corrosion rate through a whole number anodic valence lower than corrosion product valence, implying that the corrosion continues through faster chemical reaction. Another small number of corrosion interface compositions have been found in which the valence of anodic reaction produces accurate measurement when taken as a greater whole number than corrosion product valence, apparently consequent to fractional deposition of corroded metal in the cathodic corrosion reaction.

The problem of attempting to measure accelerated corrosion rate in actual industrial systems is much more severe than that represented by the laboratory investigations summarized above. Corrosion occurring in the processing industries, as typified by open recirculating cooling towers, can include such factors as variations in composition of make-up water, continual and rapid changes in concentration, considerable variations in temperature, changes in pH, variation of flow rate, and miscellaneous variations caused by such factors as scale formation, bacterial contamination, and the use of different kinds of water treatment chemicals in varying concentrations. Industrial practice calls for a substantially instantaneous or very rapid method for measuring accelerated corrosion, thereby to control rapidly changing corrosion rates, undergoing wide range of change of acceleration intensity.

A method of measurement of accelerated corrosion current has been described in my original application, Ser. No. 791,653, filed Jan. 16, 1969 (now U.S. Pat. No. 3,694,324). As therein described, a first current $i_A$ is measured through use of proportionality principles set forth in my U.S. Pat. No. 3,069,332. An increment of current $i_x$ is added to the electrode system to cathodically polarize the corrosion interface of an electrode or electrodes. The value of the added current $i_x$ for cathodic polarization is varied and measurements of corrosion current made. When the measured current passes to a minimum value it is then taken as a measure of a bounding current $i_B$. The rate determining current $i_R$ is calculated through the relationship $$i_R = 2.4\ (i_A) \text{ minus } i_B.$$

The method is more fully disclosed and claimed in my aforesaid U.S. Pat. No. 3,694,324.

The present invention is directed to improved circuitry for making these corrosion current measurements in a manner substantially avoiding introduction of error in measurement of the corrosion current.

Other purposes of the present invention will become evident from an examination of the following detailed description and drawings when taken with the accompanying claims.

Figure 2:
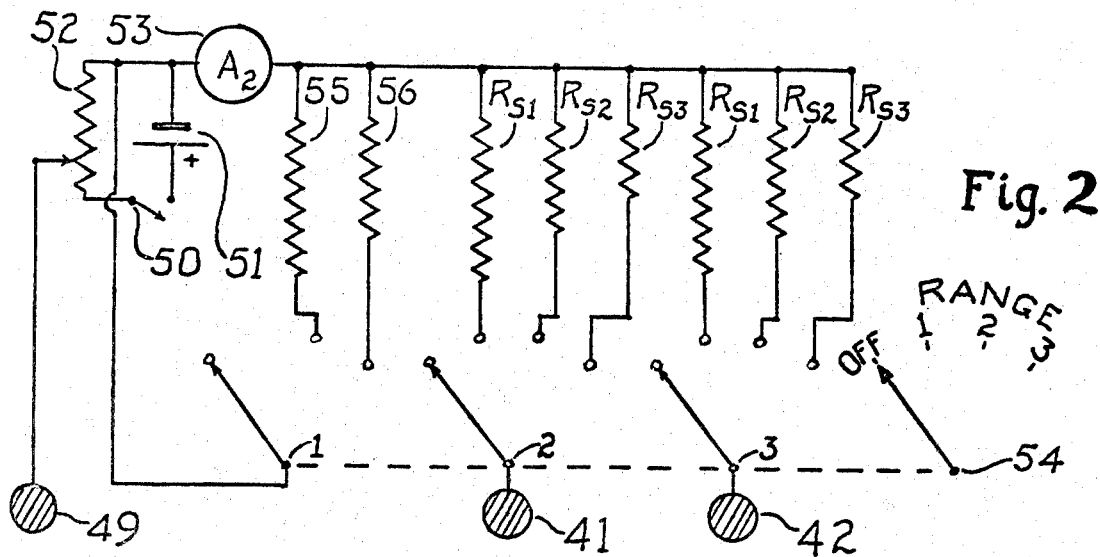

FIG. 1 is a diagram of the basic circuit of the device through which the method above referred to may be practiced; and FIG. 2 is a diagram of an elaboration on the circuit of FIG. 1.

According to the present invention, the range of relationship is measured between increased values of cathodic polarizing current $i_x$ passed to the measured electrode from an anode electrode introduced for the purpose, and corrosion current as measured from a system of duplicated measured electrodes or of duplicated electrodes, one of which is measured and the other of which is the reference electrode. A value of current equal to $2i_x$ is passed from the anode and a value of current equal to $i_x$ is received by each of the duplicated electrodes, and the circuit passing this current must be isolated from the corrosion current measurement circuit to substantially avoid introducing error in measurement of the corrosion current. For this purpose, a circuit isolation device connects the series circuit of two duplicated isolation resistors $R_s$, across the two duplicated electrodes, and produces the total current $2i_x$ by applying variable DC voltage of proper polarity between the connection point of the two series resistors $R_s$ and the anode electrode, in which the ohmic value of isolation resistors $R_s$ is selected to be large enough to introduce negligible positive error in the range of corrosion current being measured. Under these conditions, a series of measurements are made of corrosion current and of value of current $i_x$ producing cathodic polarization during the corrosion current measurement, with different values of $i_x$ in this series being selected to determine the minimum value of corrosion current, which is taken as the measurement of bounding current $i_B$.

FIG. 1 shows essential details of a circuit for cathodically polarizing electrodes during bounding current measurement, without introducing any significant disturbance to the operation of the corrosion current measurement circuit. It is shown connected to duplicated electrodes 41 and 42.

The corrosion current measurement circuit operates according to my U.S. Pat. No. 3,069,332, as follows. Battery 43 is connected to potentiometer 44 by closing switch 45. The voltage delivered across voltmeter 46 is adjusted by positioning the arm of potentiometer 44, and passes through the polarity reversing switch 47 to the electrodes 41 and 42. Voltmeter 46 may be of a type drawing substantially no current, so that microammeter 48 measures the polarizing current, $i_p$. Usually the DC voltage applied to duplicated electrodes is selected as 0.02 volt, plus any additional voltage added to compensate for voltage loss through the ionic conductor. At the time selected for taking the measurements, the polarizing current $i_p$ produces substantially 0.010 volt of anodic polarization on the one electrode and 0.010 volt of cathodic polarization on the other electrode. The reversing switch 47, reverses the direction of the current passed between the electrodes, to produce a second measurement for obtaining an average from the two measurements. Electrode polarization resistance is diagramatically represented as $r_p$, and ionic conductor resistance between the opposed electrodes is diagramatically represented as $R_i$.

In the circuit for cathodically polarizing electrodes 41 and 42 during bounding current measurement, an additional electrode 49 is required. It may be used in alternative shapes and positions described below, but for present purposes illustrating precision measurement, it is in the form of a third duplicated electrode. It is positioned equidistant from electrodes 41 and 42, so that it can pass a substantially equal cathodic current to each of them, and its positioning for this criteria becomes less critical with increase in its separation distance. The circuit diagram indicates such positioning by showing that its path of conduction through its polarization resistance $r_p'$ and through part of the ionic conductor resistance $R_i'$, operates through the center of the ionic conductor resistance $R_i$ between electrodes 41 and 42. The closing of switch 50 connects battery 51 to potentiometer 52, and the position of the potentiometer arm adjusts the voltage applied between electrode 49 operating as an external anode and electrodes 41 and 42, each receiving the externally applied cathodic current $i_x$. Meter 53 measures the current, $2i_x$. An isolation resistor $R_s$, is in series with the lead from anode electrode 49 to each of the duplicated electrodes 41 and 42, and these resistors operate to avoid interference with the corrosion current measurement circuit, as follows.

Operation of the equal isolation resistors $R_s$, becomes easily visualized through the following analysis. As the value of these resistors is decreased toward 0, their connection to electrodes 41 and 42 places an ohmic resistance of decreasing value across the corrosion current measurement circuit, and introduces an increasing positive error in its current measurement. This effect decreases as the value of resistors $R_s$ is increased, but such increase also increases the voltage drop across them produced by current $i_x$, which in turn increases the voltage requirement of battery 51. The compromise between these two effects can vary with choice in circuit design and still be within the scope of this invention, and the following illustrates one form of specific design, as follows.

An example of a form of isolation device for producing the cathodic polarization during bounding current measurement is shown in FIG. 2. The connection of isolation resistors $R_s$, to electrodes 41 and 42, and the selection of a plurality of range values for the $R_s$ resistors and for the microammeter shunts is accomplished through the three-pole, four-position selector switch 54. In the "off" position, no connection is made to electrodes 41 and 42. The Range 1, 2, and 3 positions connect increasing range values of $R_s$ to the electrodes through poles 54-2 and 54-3. In the range 1 dial position, meter 53 operates without a shunt. In the Range 2 and 3 positions, pole 54-1 connects corresponding range multiplier shunts across meter 53. A fourth switch pole, not shown, could operate as switch 50, to connect battery 51 with the connection of the $R_s$ resistors.

By way of specific illustration of FIG. 2, the circuit values for one form of its operation are summarized in Table III which follows below. Operation is divided into three decade ranges of meter 53 operation, starting with a 10 to 100 mma. range. Operating instructions call for starting with the smallest range, and switching to the next higher range only when meter 53 is about to go off scale. This also requires reducing the voltage delivered from potentiometer 52 before switching to a next higher range.

The ohmic value of separation resistor $R_s$ is determined through the criteria that it produce only a certain maximum error in the smallest value of corrosion current to be measured within the range in which the $R_s$ resistor is connected.

The following table illustrates typical ranges of resistances utilized with the circuit of FIG. 2.

TABLE III

| Range Nr. | Multi-Range $i_x$ Delivery Device Meter 53 mma. Range | $i_x$ mma. Range | $R_s$ Ohms |
|---|---|---|---|
| 1 | 10–100 | 5–50 | 200,000 |
| 2 | 100–1,000 | 50–500 | 20,000 |
| 3 | 1,000–10,000 | 500–5,000 | 2,000 |

The maximum voltage to be delivered by battery 51 through potentiometer 52 can be calculated according to Kirchoff's Loop Rule. From loop (L) shown in FIG. 1, maximum voltage $e_x$ delivered from potentiometer 52 is, $e_x = 2i_x(r_p + R_i') + (i_x - i_p)(R_i/2 + r_p) + (i_x + i_s)(R_s)$. By taking electrode 49 in the form of a third duplicated electrode, it is a safe estimate to regard $r_p' = r_p$, and $R_i' = R_i$, since a larger anode, such as a container wall, would reduce the requirement for $e_x$. The above equation then simplifies to, $e_x = i_x(R_s + 3r_p + 2.5R_i) + i_sR_s - i_p(R_i/2 + r_p)$. From inspection it is seen that the second and third terms are each equal to 0.01 volt and cancel out, leaving $e_x = i_x(R_s + 3r_p + 2.5R_i)$. At the top of Range 1, $i_x = 50$ mma., and $R_s$ is about 100 times greater than $r_p$ or $R_i$, so a reasonable estimate is, $e_x = i_xR_s = (50 \times 10^{-6})(2\times10^5) = 10$ volts. Smaller range span can reduce battery 51 voltage requirement, and the device of this invention is not limited to specific battery voltage selected for battery 51.

In precision corrosion current measurement, factors which tend to produce difference in performance between the measured duplicated electrodes should be minimized, and may require correction, as follows. The accelerated form of corrosion usually produces some difference between the free electrode potentials of the duplicated electrodes 41 and 42, but the extent of this difference is usually not significantly altered by application of total current $2i_x$. The duplicated resistors, $R_s$, should be equal within high precision, such as about ±0.1 percent. Slight difference between electrode 41 and 42 polarizabilities, as from area difference, can cause difference between the electrode potentials polarized by total current $2i_x$. Such difference between electrode potentials can be corrected for, through the series insertion into the corrosion current measurement circuit of an opposed voltage from a low ohmic resistance source.

Calculation of meter shunt resistors 55 and 56 of FIG. 2, for meter 53 of particular internal DC ohmic resistance, is known to the art.

The circuit isolation device of this invention is not limited to operation with values of isolation resistance $R_s$ of sufficient size to introduce negligible effect on the corrosion current measurement. Values of $R_s$ can be used which introduce definite positive error in the corrosion current measurement, and this error may not require correction for some purposes, while for other purposes, the error can be measured and corrected for by subtraction. There are many evident procedures for correcting for current $i_s$ in FIG. 2. If the ohmic value of $R_s$ is known, correction can be made through mathematical calculation. When duplicated electrodes 41 and 42 are both operated as measured electrodes, current $i_s$ is measured directly when the electrodes are disconnected and the same value of applied DC voltage is delivered across voltmeter 46. A procedure for measuring $i_s$ which is applicable when electrodes 41 and 42 are both measured as well as when one electrode is operated as a measured electrode and the other electrode is operated as a reference electrode, includes measuring the value of corrosion current with resistors $R_s$ connected to the electrodes when current $i_x$ is 0, measuring the value of corrosion current in the same manner but with resistors $R_s$ disconnected from the electrodes, and measuring $i_s$ as the difference between these two values of measured corrosion current. From this, it becomes evident that it is much easier to operate with values of $R_s$ large enough to introduce negligible positive error.

The circuit isolation device described above enables measurement to be made, through the circuit isolation alternative, of the relationship between the cathodic polarizing current $i_x$ and corrosion current measurable during $i_x$ application, from which bounding current $i_B$ is measured as the minimum value of corrosion current in this relationship, and rate-determining corrosion current $i_R$ is approximately indicated as the value of $i_x$ at said minimum value of corrosion current. The corrosion current measurements are preferably made on a corrosion system including two duplicated electrodes, both of which may be operated as measured electrodes or one of which may be operated as the measured electrodes with the other operated as a reference electrode, while current $i_x$ is passed to each of these electrodes through the circuit isolation device.

I claim:

1. A device for cathodically polarizing two duplicated electrodes with substantially no interference with corrosion current measurement made with said electrodes, including an anode terminal for connecting to an anode electrode, a source of variable DC voltage with positive pole connected to said anode terminal, a current indicating meter in series with said source of variable DC voltage, two duplicated isolation resistors each connected at one end to the negative pole of said variable voltage delivery system, said indicating meter being in a series circuit with said anode terminal and said isolation resistors, and two cathode terminals each connected to the other end of one of said two isolation resistors and for connection to the two duplicated electrodes.

2. A device for cathodically polarizing two duplicated electrodes with substantially no interference with corrosion current measurement made with said electrodes, including an anode terminal for connecting to an anode electrode, a source of variable DC voltage with positive pole connected to said anode terminal, a current indicating meter in series with said source of variable DC voltage, a drive mechanism coupled to said source of variable DC voltage to deliver the voltage at a selected regularly increasing rate, two duplicated isolation resistors each connected at one end to the negative pole of said variable voltage delivery systems, said indicating meter being in a series circuit with said anode terminal and said isolation resistors, and two cathode terminals each connected to the other end of one of said two isolation resistors and for connecting to the two duplicated electrodes.

* * * * *